United States Patent
Simionescu et al.

(10) Patent No.: US 10,528,438 B2
(45) Date of Patent: Jan. 7, 2020

(54) METHOD AND SYSTEM FOR HANDLING BAD BLOCKS IN A HARDWARE ACCELERATED CACHING SOLUTION

(71) Applicant: Avago Technologies International Sales Pte. Limited, Singapore (SG)

(72) Inventors: Horia Simionescu, Foster City, CA (US); Gowrisankar Radhakrishnan, Colorado Springs, CO (US); Timothy Hoglund, Colorado Springs, CO (US); Sridhar Rao Veerla, Bangalore (IN); Panthini Pandit, Bangalore (IN)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 162 days.

(21) Appl. No.: 15/605,348

(22) Filed: May 25, 2017

(65) Prior Publication Data

US 2018/0341564 A1    Nov. 29, 2018

(51) Int. Cl.
*G06F 11/20* (2006.01)
*G06F 12/0808* (2016.01)
*G06F 12/1018* (2016.01)
*G06F 16/901* (2019.01)
*G06F 16/903* (2019.01)

(52) U.S. Cl.
CPC ...... *G06F 11/2017* (2013.01); *G06F 12/0808* (2013.01); *G06F 12/1018* (2013.01); *G06F 16/9014* (2019.01); *G06F 16/9017* (2019.01); *G06F 16/90335* (2019.01); *G06F 2201/805* (2013.01); *G06F 2212/621* (2013.01)

(58) Field of Classification Search
CPC .......... G06F 11/2017; G06F 16/90335; G06F 16/9014; G06F 16/9017; G06F 3/0619; G06F 3/0659; G06F 3/067; G06F 12/0808; G06F 12/1018; G06F 2201/805; G06F 2212/621
See application file for complete search history.

(56) References Cited

U.S. PATENT DOCUMENTS

| | | | |
|---|---|---|---|
| 8,255,613 B2 | 8/2012 | Abali et al. | |
| 8,954,790 B2 | 2/2015 | Rangarajan et al. | |
| 9,092,357 B2 | 7/2015 | Davis et al. | |
| 2005/0050383 A1* | 3/2005 | Horn | G06F 11/2087 714/6.22 |
| 2013/0124931 A1* | 5/2013 | Chen | G11C 16/349 714/718 |
| 2014/0006712 A1* | 1/2014 | Tucek | G06F 12/0246 711/118 |
| 2014/0115235 A1* | 4/2014 | Ito | G06F 12/0868 711/103 |

(Continued)

*Primary Examiner* — Paul Contino
(74) *Attorney, Agent, or Firm* — Sheridan Ross P.C.

(57) ABSTRACT

A system and method for managing bad blocks in a hardware accelerated caching solution are provided. The disclosed method includes receiving an Input/Output (I/O) request, performing a hash search for the I/O request against a hash slot data structure, and based on the results of the hash search, either performing the I/O request with a data block identified in the I/O request or diverting the I/O request to a new data block not identified in the I/O request. The diversion may also include diverting the I/O request from hardware to firmware of a memory controller.

17 Claims, 5 Drawing Sheets

(56) References Cited

U.S. PATENT DOCUMENTS

| | | | | |
|---|---|---|---|---|
| 2014/0164715 A1* | 6/2014 | Weiner | ............... | G06F 3/0659 |
| | | | | 711/143 |
| 2014/0359216 A1* | 12/2014 | Sheffield | ............ | G06F 3/0689 |
| | | | | 711/114 |
| 2017/0242794 A1* | 8/2017 | Simionescu | ........ | G06F 12/0895 |

* cited by examiner

METHOD AND SYSTEM FOR HANDLING BAD BLOCKS IN A HARDWARE ACCELERATED CACHING SOLUTION

FIELD OF THE DISCLOSURE

The present disclosure is generally directed toward computer memory.

BACKGROUND

Memory solutions such as flash memory and certain RAID systems provide a Bad Block Management (BBM) feature where the bad blocks on a physical drive are cleared by writing a value of '0' and the logical drive-level bad block information is maintained in a software table. When caching is accelerated in hardware, existing BBM solutions cannot simply be used to manage the bad blocks on a physical drive.

BRIEF DESCRIPTION OF THE DRAWINGS

The present disclosure is described in conjunction with the appended figures, which are not necessarily drawn to scale.

DETAILED DESCRIPTION

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "and/or" includes any and all combinations of one or more of the associated listed items.

As will be discussed in further detail herein, a method and system are provided that enable bad block processing in a hardware accelerated caching solution. The proposed method identifies the presence of a bad block using a hash value, which is ultimately used in aiding the hardware of the controller to perform automated caching even though a logical disk contains a bad block. The proposed system and method effectively reduce the search time in hardware during a read or write operation, which improves system performance.

In some embodiments, when row/strip needs to be cached, the cache segment ID (CSID) that represents the row/strip is added to a hash slot along with the hash tag (e.g., row/strip number or a combination of row/strip along with a logical drive number).

When an unrecoverable medium error is detected on an LBA, a bad block entry is added to a software bad block table and at the same time a unique signature (e.g., a string of 0's) is written to those LBAs. In a hardware accelerated caching solution, when the bad block is present in the table, the I/O commands from the host cannot completely pass through an automated path.

Searching a bad block table by the caching hardware results in significant performance degradation. Hence the indication of a bad block is provided to the hardware with a simple method utilizing the hashing functions. The false positive matches are resolved by the controller firmware which can search the bad block table to check if the LBA is present for the bad block. If not, then the I/O command can be processed in an automated path.

Although embodiments of the present disclosure will be described in connection with managing a RAID architecture (e.g., a RAID-5 or RAID-6 type of architecture), it should be appreciated that embodiments of the present disclosure are not so limited. In particular, any controller implements hardware accelerated caching and manages bad blocks in memory (regardless of memory architecture used) can benefit from embodiments of the present disclosure.

With reference to FIGS. 1-5, various embodiments of the present disclosure will be described. While many of the examples depicted and described herein will relate to a RAID architecture, it should be appreciated that embodiments of the present disclosure are not so limited. Indeed, aspects of the present disclosure can be used in any type of computing system and/or memory environment. In particular, embodiments of the present disclosure can be used in any type of memory scheme (whether employed by a RAID controller or some other type of device used in a communication system). In particular, hard drives, hard drive controllers (e.g., SCSI controllers, SAS controllers, or RAID controllers), flash drives, flash drive controllers, etc. may be configured to implement embodiments of the present disclosure. As another example, network cards or the like having cache memory may also be configured to implement embodiments of the present disclosure.

Figure 1:
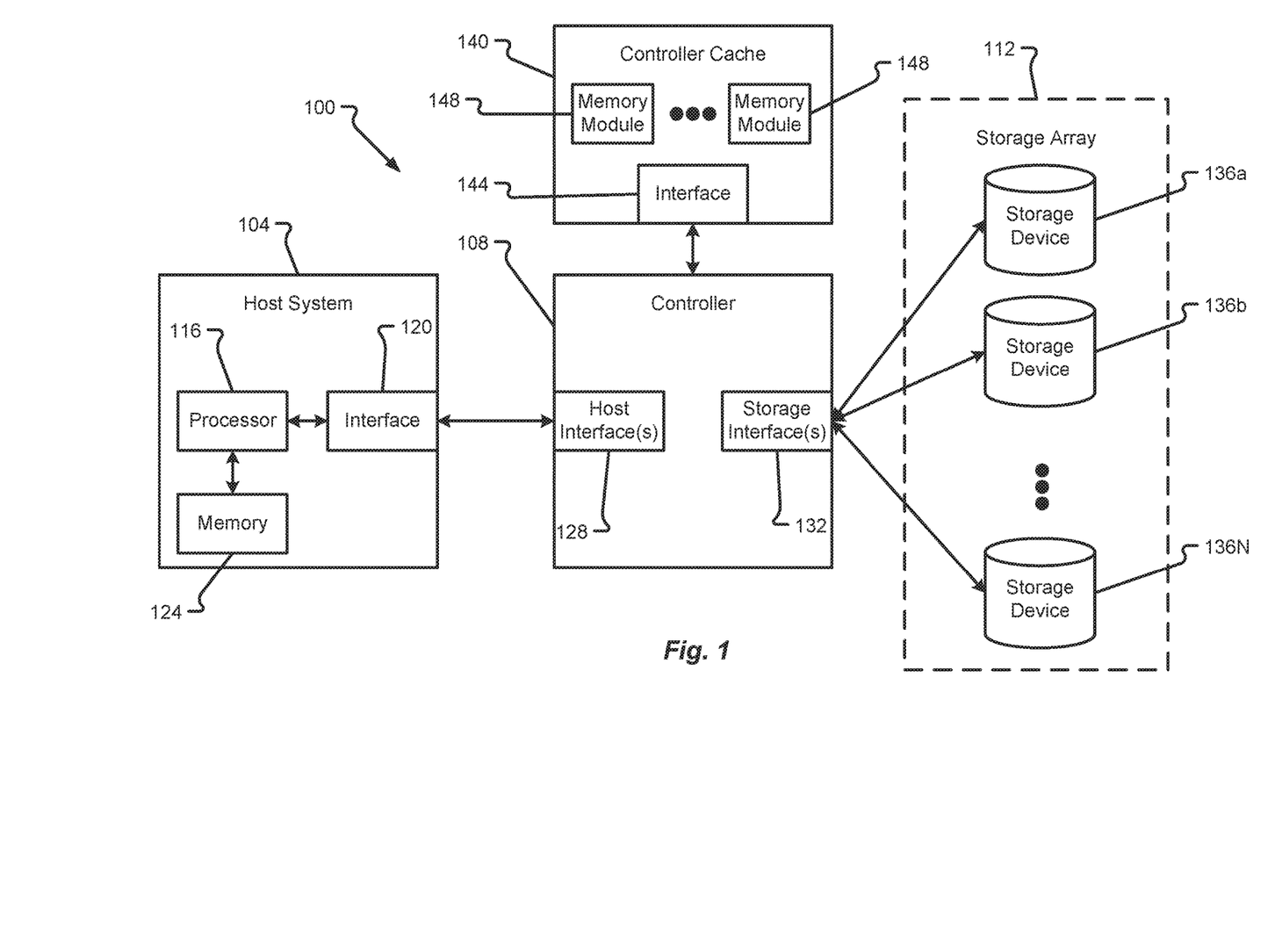
FIG. 1 is a block diagram depicting a computing system in accordance with at least some embodiments of the present disclosure.

With reference now to FIG. 1, additional details of a computing system 100 capable of implementing memory management techniques will be described in accordance with at least some embodiments of the present disclosure. The computing system 100 is shown to include a host system 104, a controller 108 (e.g., a SCSI controller, a SAS controller, a RAID controller, etc.), and a storage array 112 having a plurality of storage devices 136*a*-N therein. The system 100 may utilize any type of data storage architecture. The particular architecture depicted and described herein (e.g., a RAID architecture) should not be construed as limiting embodiments of the present disclosure. If implemented as a RAID architecture, however, it should be appreciated that any type of RAID scheme may be employed (e.g., RAID-0, RAID-1, RAID-2, . . . , RAID-5, RAID-6, etc.).

In a RAID-0 (also referred to as a RAID level 0) scheme, data blocks are stored in order across one or more of the storage devices 136a-N without redundancy. This effectively means that none of the data blocks are copies of another data block and there is no parity block to recover from failure of a storage device 136. A RAID-1 (also referred to as a RAID level 1) scheme, on the other hand, uses one or more of the storage devices 136a-N to store a data block and an equal number of additional mirror devices for storing copies of a stored data block. Higher level RAID schemes can further segment the data into bits, bytes, or blocks for storage across multiple storage devices 136a-N. One or more of the storage devices 136a-N may also be used to store error correction or parity information.

A single unit of storage can be spread across multiple devices 136a-N and such a unit of storage may be referred to as a stripe. A stripe, as used herein and as is well known in the data storage arts, may include the related data written to multiple devices 136a-N as well as the parity information written to a parity storage device 136a-N. In a RAID-5 (also referred to as a RAID level 5) scheme, the data being stored is segmented into blocks for storage across multiple devices 136a-N with a single parity block for each stripe distributed in a particular configuration across the multiple devices 136a-N. This scheme can be compared to a RAID-6 (also referred to as a RAID level 6) scheme in which dual parity blocks are determined for a stripe and are distributed across each of the multiple devices 136a-N in the array 112.

One of the functions of the controller 108 is to make the multiple storage devices 136a-N in the array 112 appear to a host system 104 as a single high capacity disk drive (e.g., as a storage volume). Thus, the controller 108 may be configured to automatically distribute data supplied from the host system 104 across the multiple storage devices 136a-N (potentially with parity information) without ever exposing the manner in which the data is actually distributed to the host system 104.

In the depicted embodiment, the host system 104 is shown to include a processor 116, an interface 120, and memory 124. It should be appreciated that the host system 104 may include additional components without departing from the scope of the present disclosure. The host system 104, in some embodiments, corresponds to a user computer, laptop, workstation, server, collection of servers, or the like. Thus, the host system 104 may or may not be designed to receive input directly from a human user.

The processor 116 of the host system 104 may include a microprocessor, central processing unit (CPU), collection of microprocessors, or the like. The memory 124 may be designed to store instructions that enable functionality of the host system 104 when executed by the processor 116. The memory 124 may also store data that is eventually written by the host system 104 to the storage array 112. Further still, the memory 124 may be used to store data that is retrieved from the storage array 112. Illustrative memory 124 devices may include, without limitation, volatile or non-volatile computer memory (e.g., flash memory, RAM, DRAM, ROM, EEPROM, etc.).

The interface 120 of the host system 104 enables the host system 104 to communicate with the controller 108 via a host interface 128 of the controller 108. In some embodiments, the interface 120 and host interface(s) 128 may be of a same or similar type (e.g., utilize a common protocol, a common communication medium, etc.) such that commands issued by the host system 104 are receivable at the controller 108 and data retrieved by the controller 108 is transmittable back to the host system 104. The interfaces 120, 128 may correspond to parallel or serial computer interfaces that utilize wired or wireless communication channels. The interfaces 120, 128 may include hardware that enables such wired or wireless communications. The communication protocol used between the host system 104 and the controller 108 may correspond to any type of known host/memory control protocol. Non-limiting examples of protocols that may be used between interfaces 120, 128 include SAS, SATA, SCSI, FibreChannel (FC), iSCSI, ATA over Ethernet, InfiniBand, or the like.

The controller 108 may provide the ability to represent the entire storage array 112 to the host system 104 as a single high volume data storage device. Any known mechanism can be used to accomplish this task. The controller 108 may help to manage the storage devices 136a-N (which can be hard disk drives, sold-state drives, or combinations thereof) so as to operate as a logical unit. In some embodiments, the controller 108 may be physically incorporated into the host device 104 as a Peripheral Component Interconnect (PCI) expansion (e.g., PCI express (PCI)e) card or the like. In such situations, the controller 108 may be referred to as a RAID adapter.

The storage devices 136a-N in the storage array 112 may be of similar types or may be of different types without departing from the scope of the present disclosure. The storage devices 136a-N may be co-located with one another or may be physically located in different geographical locations. The nature of the storage interface 132 may depend upon the types of storage devices 136a-N used in the storage array 112 and the desired capabilities of the array 112. The storage interface 132 may correspond to a virtual interface or an actual interface. As with the other interfaces described herein, the storage interface 132 may include serial or parallel interface technologies. Examples of the storage interface 132 include, without limitation, SAS, SATA, SCSI, FC, iSCSI, ATA over Ethernet, InfiniBand, or the like.

The controller 108 is shown to have communication capabilities with a controller cache 140. While depicted as being separate from the controller 108, it should be appreciated that the controller cache 140 may be integral to the controller 108, meaning that components of the controller 108 and the controller cache 140 may be contained within a single physical housing or computing unit (e.g., server blade). The controller cache 140 is provided to enable the controller 108 to perform caching operations. The controller 108 may employ caching operations during execution of I/O commands received from the host system 104. Depending upon the nature of the I/O command and the amount of information being processed during the command, the controller 108 may require a large number of cache memory modules 148 (also referred to as cache memory) or a smaller number of cache memory modules 148. The memory modules 148 may correspond to flash memory, RAM, DRAM, DDR memory, or some other type of computer memory that is quickly accessible and can be rewritten multiple times. The number of separate memory modules 148 in the controller cache 140 is typically larger than one, although a controller cache 140 may be configured to operate with a single memory module 148 if desired.

The cache interface 144 may correspond to any interconnect that enables the controller 108 to access the memory modules 148, temporarily store data thereon, and/or retrieve data stored thereon in connection with performing an I/O command or some other executable command. In some embodiments, the controller cache 140 may be integrated with the controller 108 and may be executed on a CPU chip or placed on a separate chip within the controller 108. In such a scenario, the interface 144 may correspond to a separate bus interconnect within the CPU or traces connecting a chip of the controller cache 140 with a chip executing the processor of the controller 108. In other embodiments, the controller cache 140 may be external to the controller 108 in which case the interface 144 may correspond to a serial or parallel data port.

Figure 2:
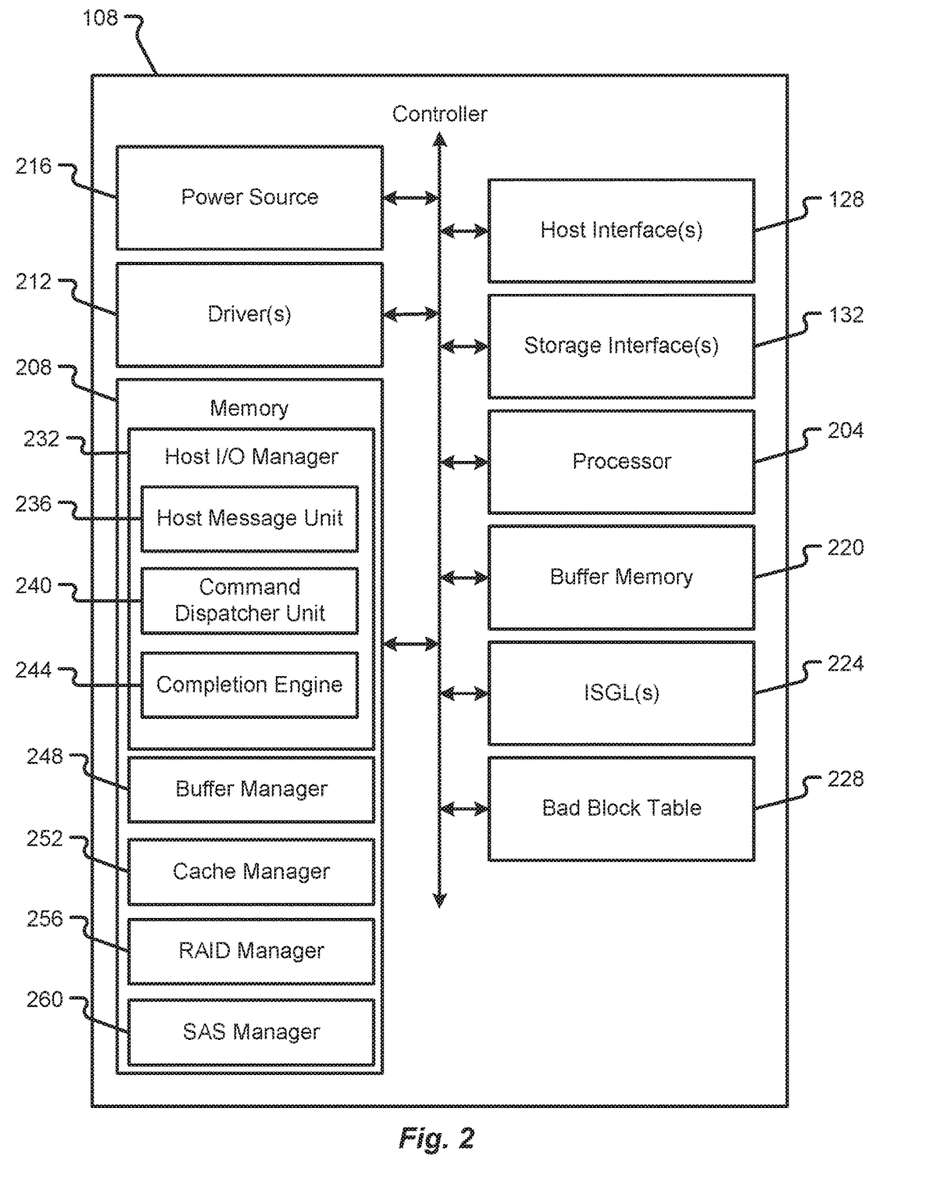
FIG. 2 is a block diagram depicting details of an illustrative controller in accordance with at least some embodiments of the present disclosure.

With reference now to FIG. 2 additional details of a controller 108 will be described in accordance with at least some embodiments of the present disclosure. The controller 108 is shown to include the host interface(s) 128 and storage interface(s) 132. The controller 108 is also shown to include a processor 204, memory 208 (e.g., a main controller memory), one or more drivers 212, and a power source 216.

The processor 204 may include an Integrated Circuit (IC) chip or multiple IC chips, a CPU, a microprocessor, or the like. The processor 204 may be configured to execute instructions in memory 208 that are shown to include a host I/O manager 232, a buffer manager 248, a cache manager 252, a RAID manager 256, and a SAS manager 260. Furthermore, in connection with performing caching functions, buffer functions, or bad block management functions, the processor 204 may utilize buffer memory 220, one or more Internal Scatter Gather Lists (ISGLs) 224, and a bad block table 228. The host I/O manager 232 is shown to include a plurality of sub-routines that include, without limitation, a host message unit 236, a command extraction unit 240, and a completion engine 244.

Each of the components (e.g., host I/O manager 232, buffer manager 248, cache manager 252, RAID manager 256, and SAS manager 260) may correspond to different functional blocks that operate in their own local memory loading the global memory (e.g. a global buffer memory 220 or memory 208) on an as-needed basis. Each of these different functional blocks can be accelerated by different hardware threads without departing from the scope of the present disclosure. The controller 108 may be considered to have hardware and firmware components. The various manager components (e.g., host I/O manager 232, buffer manager 248, cache manager 252, RAID manager 256, and SAS manager 260) may be considered firmware components even though they can be accelerated by different hardware threads. The hardware components of the controller 108 may include drivers 212, the processor 204, the interfaces 128, 132, the controller cache 140, etc. As will be discussed in further detail herein, the hardware components and software components of the controller 108 may be enabled to communicate with one another using specialized messages (e.g., LMIDs). These messages may contain information describing operations or routines to be executed by the various components of the controller 108 as well as results of operations already performed by the controller 108.

The memory 208 may be volatile and/or non-volatile in nature. As indicated above, the memory 208 may include any hardware component or collection of hardware components that are capable of storing instructions and communicating those instructions to the processor 204 for execution. Non-limiting examples of memory 208 include RAM, ROM, flash memory, EEPROM, variants thereof, combinations thereof, and the like. Similarly, the buffer memory 220 may be volatile or non-volatile in nature. The buffer memory may be configured for multiple read/writes and may be adapted for quick access by the processor 204.

The instructions stored in memory 208 are shown to be different instruction sets, but it should be appreciated that the instructions can be combined into a smaller number of instruction sets without departing from the scope of the present disclosure. The host I/O manager 232, when executed, enable the processor 204 to manage I/O commands received from the host system 104 and facilitate higher-level communications with the host system 104. In some embodiments, the host I/O manager 232 may utilize the host message unit 236 to process incoming messages received from the host system 104. As a non-limiting example, the controller 108 may receive messages from the host system 104 in an MPI protocol. The host message unit 236 may bring down the messages received from the host system 104 and pass the content of the messages to the command dispatcher unit 240. The command extraction unit 240 may be configured to determine if a particular command in a message is acceleratable (e.g., capable of being passed to a particular functional block to facilitate hardware acceleration). If a command is determined to be acceleratable, then the command dispatcher unit 240 may implement a hardware acceleration process and generate an appropriate Local Message ID (LMID) that represents all of the information received from the host system 104 (in the command). The LMID effectively represents the command received from the host system 104, but is in a different format that is understandable by the managers 248, 252, 256, 260. The command dispatcher unit 240 may, in some embodiments, route the various commands (e.g., LMIDs) to one or more of the buffer manager 248, cache manager 252, RAID manager 256, and SAS manager 260. The routing of the commands may depend upon a type of the command and the function to be executed. The completion engine of the host I/O manager 232 may be responsible for reporting to the host system 104 that an I/O command has been completed by the controller 108.

The buffer manager 248 may include instructions that, when executed, enable the processor 204 to perform various buffer functions. As an example, the buffer manager 248 may enable the processor 204 to recognize a write command and utilize the buffer memory 220 in connection with executing the write command. In some embodiments, any command or function that leverages the buffer memory 220 may utilize the buffer manager 248.

The cache manager 252 may include instructions that, when executed, enable the processor 204 to perform various caching functions. As an example, the cache manager 252 may enable the processor 204 to respond to read commands or read-ahead commands. The cache manager 252 may also enable the processor 204 to communicate with the controller cache 140 and leverage the memory modules 148 of the controller cache 140. The cache manager 252 may also manage the creation and lifecycle of cache frame anchors and/or ISGLs 224. As an example, as caching functions are executed, one or more cache frame anchors may be created or utilized to facilitate the caching function. As used herein, an ISGL may represent the snapshot of data at a given point in time it is used. In some embodiments, the ISGL is capable of encapsulating all the metadata that is required for an I/O read/write and/or read-ahead request, thereby providing an efficient communication mechanism between various modules for processing the read/write and/or read-ahead operations.

The RAID manager 256 and/or SAS manager 260 may include instructions that, when executed, enable the processor 204 to communicate with the storage array 112 or storage devices 136 therein. In some embodiments, the RAID manager 256 and/or SAS manager 260 may receive commands either directly from the host I/O manager 232 (if no caching was needed) or they may receive commands from the cache manager 252 after an appropriate caching process has been performed. When invoked, the RAID manager 256 and/or SAS manager 260 may enable the processor 204 to finalize read or write commands and exchange data with the storage array 112.

The driver(s) 212 may comprise firmware, hardware, software, or combinations thereof that enable the processor 204 to make use of other hardware components in the controller 108. For instance, different drivers 212 may be provided to support functions of the interfaces 128, 132. As another example, separate drivers 212 may be provided to support functions of the buffer memory 220. The drivers 212 may perform the low-level routines that allow the processor 204 to communicate with the other hardware components and respond to commands received from the processor 204.

The power source 216 may correspond to hardware components that provide the controller 108 with the power necessary to run the processor 204 and other components. As an example, the power source 216 may correspond to a power converter that receives AC power from an external source (e.g., a power outlet) and converts the AC power into DC power that is useable by the other hardware components of the controller 108. Alternatively or additionally, the power source 216 may correspond to an internal power source (e.g., a battery pack, bank of capacitors, etc.) that provides power to the hardware components of the controller 108.

Figure 3:
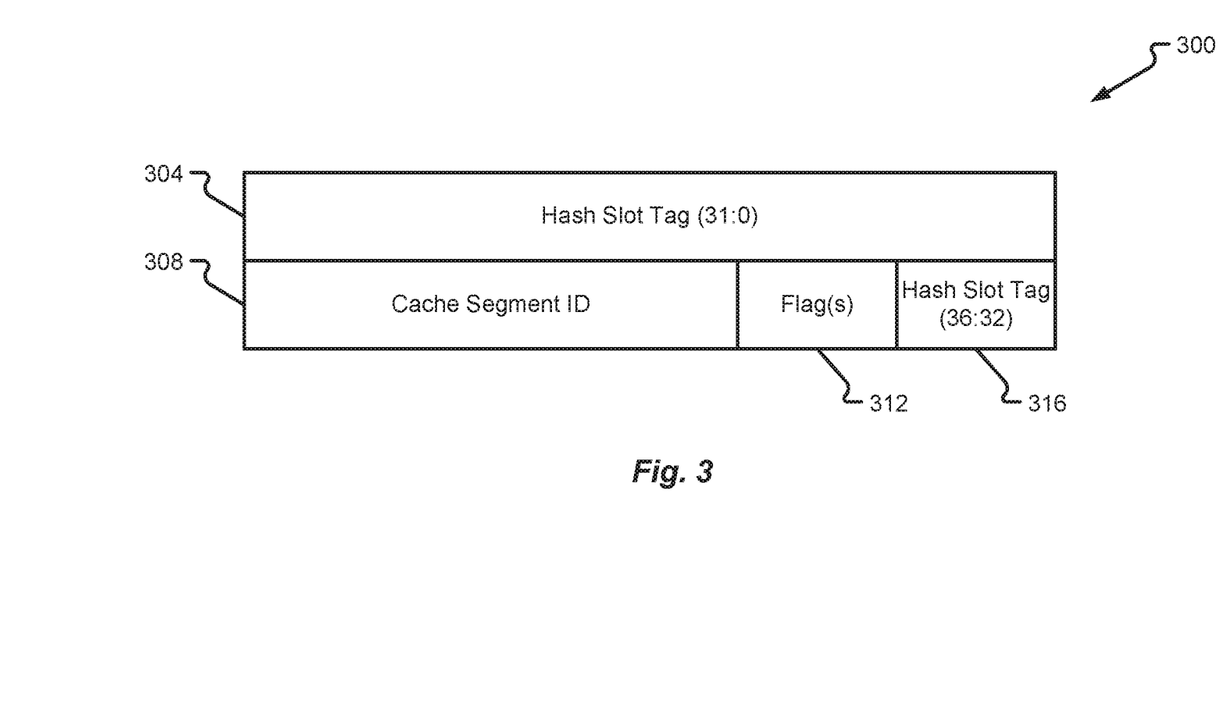
FIG. 3 is a block diagram depicting details of a data structure used in accordance with at least some embodiments of the present disclosure.

With reference now to FIG. 3, additional details of a data structure 300 will be described in accordance with at least some embodiments of the present disclosure. The data structure 300 is shown to include a number of fields that can facilitate management of bad blocks in logical drives, virtual drives, physical drives, etc. In some embodiments, the data structure 300 may correspond to a hash slot data structure used to store one or a plurality of hash slot IDs, associated flags, and the like. The depicted data structure 300, which should not be construed as limiting embodiments of the present disclosure, is shown to include a first hash slot tag field 304, a second hash slot tag field 316, a cache segment ID (CSID) field 308, and a flag(s) field 312. The hash slot tag fields 304, 316 may be used to store hash values used in connection with managing bad blocks of data that have been reported by devices 136.

The data structure 300 contains one or more flags 312 to indicate the presence of bad block and if a bad block is present whether the corresponding CSID 308 is valid or invalid. If flags value is a first predetermined value (e.g. "100"), this may provide an indication that the cache segment/row is valid in CSID field 308. If flags value is a second predetermined value (e.g., "110"), this may provide an indication of the presence of bad block(s) in strip/row, this may also represent that the CSID field 308 is valid and it represents an existing cache segment/row. If the flags value is a third predetermined value (e.g., "111"), this may provide an indication of the presence of bad block in strip/row and that the CSID field 308 not valid.

Since a row/strip contains more than one LBA, indication of a bad block in the data structure 300 does not guarantee the presence of a bad block entry in the firmware's bad block table 228. Accordingly, the controller's 108 firmware would need to resolve these false positives. When there is an unrecoverable medium error on a RAID volume, an entry is added in the bad block table 228. Along with the entry in the bad block table 228, a hash slot 304 is updated with flags '111' if a hash entry is not already present and with '110' if a hash entry is already present with a valid CSID. A new write request to the same row may be diverted to firmware after performing write buffering. This enables the firmware to check the bad block table 228 and see if the new write is overwriting the bad blocks. If this is the case, then the entry in the bad block table 228 is cleared and the flags 312 in the hash entry are cleared to indicate that there is no bad block. If the new write is not overwriting all the bad blocks in the row, then the firmware leaves the bad block table alone and the information in the flags 312 is left as-is.

While processing a read request, if the hash slot 304, 316 indicates the presence of a bad block, the read command is diverted to firmware. The firmware checks if there is an entry in the bad block table 228. If such an entry is present, then the I/O (e.g., read request) is failed back to host 104 indicating a bad block. If not, then the I/O is resubmitted back to hardware for read command processing.

When a row/strip needs to be cached the CSID that represents the row/strip is added to the hash slot along with the hash tag (e.g., a row/strip number or a combination of row/strip along with a logical device number). When an unrecoverable medium error is detected on an LBA, a bad block table 228 entry is added to the bad block table 228 and at the same time a unique signature (e.g., 0's) is written to those LBAs. In a hardware automated caching solution, when the bad block is present in the bad block table 228, the I/O commands cannot go through an automated hardware path completely. Searching the bad block table 228 by the caching hardware would result in significant performance degradation. Hence the indication of bad block is provided to the hardware with a simple method utilizing the any type of known or yet-to-be-developed hashing algorithm. The false positives are resolved by the firmware of the controller 108 which can search the bad block table 228 to check if the LBA is present in the bad block. If not they can be re-processed in an automated hardware path.

Figure 4:
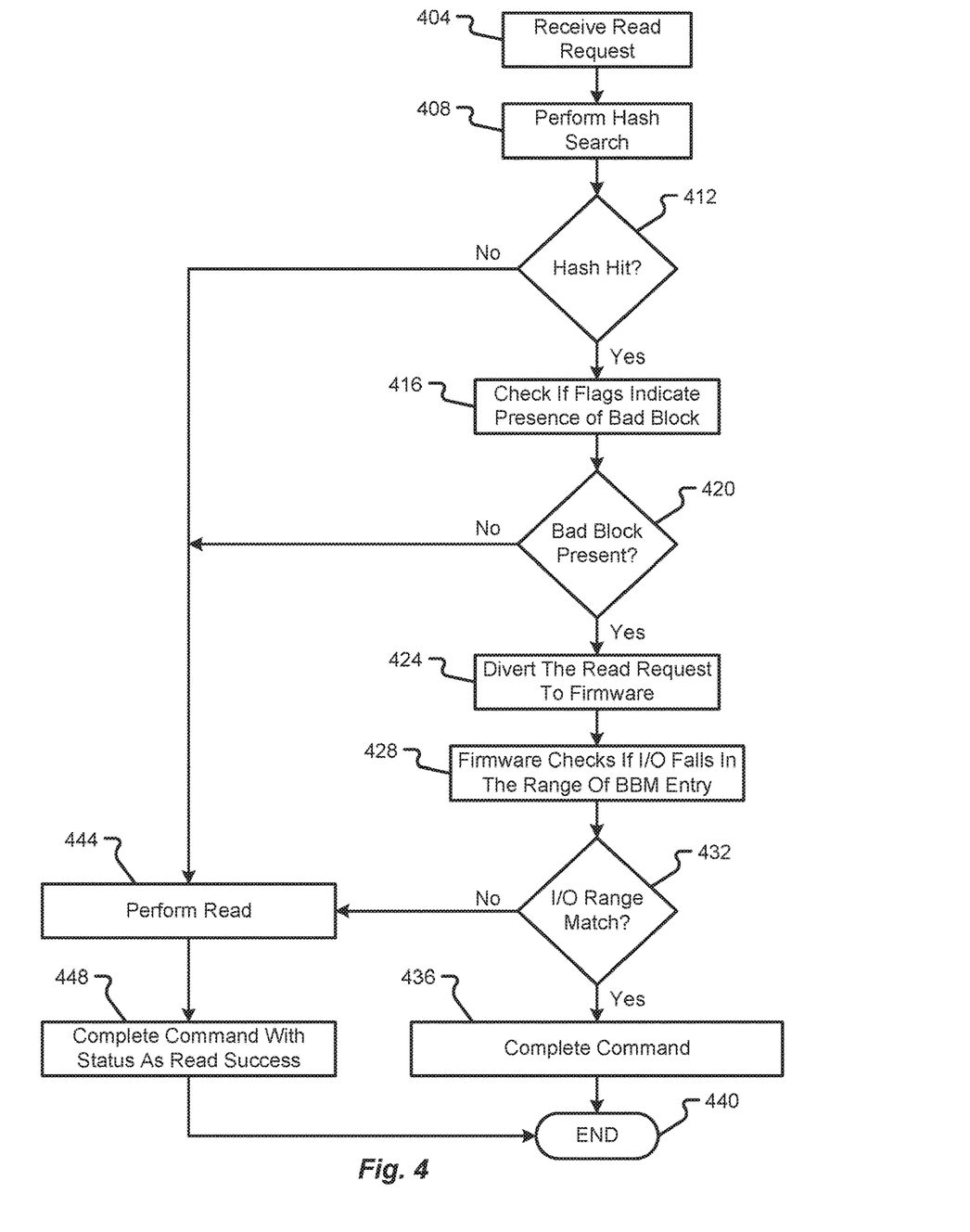
FIG. 4 is a flow diagram depicting a method of processing a read command in accordance with at least some embodiments of the present disclosure.

With reference now to FIG. 4, additional details of a method of processing a read command will be described in accordance with at least some embodiments of the present disclosure. The method begins when a read request is received at the controller 108 (step 404). When such a command is received, the method continues with the hardware of the controller 108 performing a hash search (step 408). In this step, the hardware will compute a hash value with information contained in the read request (e.g., with an LBA number, a LD Number value, etc.) which serves as an index into the hash table. Now the hardware will extract the information from the hash table for this index and check if specific details are matching. For example, hash tag derived from Row Number for this request is matching the hash tag present in the hash. (Hash Slot Tag=Strip_or_Row_number>>numb_of_hash_slots_in_bits). It should be appreciated that there could be other ways of identifying if there is a hash hit and the current method does not assume or require a specific implementation.

If a hash hit is detected (step 412), then the hardware will check the data structure 300 to determine if a bad block is present (step 416). Specifically, the hardware can check the flag(s) 312 and/or CSID 308 to determine if a predetermined value is maintained therein (e.g., a value of '110' or '111') indicating the existence of a bad block.

If a bad block is present (step 420), then the read request is diverted to firmware of the controller 108 (step 424). The firmware will then reference the bad block table 228 to see if any entries exist in the bad block table 228 that match that of the read request (step 428). Specifically, the firmware of the controller 108 may analyze the LBA or LBA range associated with the read request and if any address is listed in the bad block table 228 that falls within the LBA range associated with the read request, then the firmware will confirm the existence of a bad block associated with the read request (step 432). If this query is answered affirmatively, then the command is completed (step 436). The manner in which this step is performed may depend upon the nature of the RAID system being used. In some embodiments, if the query is answered affirmatively, then the firmware understands that the drive data for this LBA was already cleared with 0's because of presence of bad blocks and that this IO command should not be issued to the drive. For a RAID 0 volume, the firmware will complete the read request with a status as "read failed" because of the existence of the bad block containing data needed to complete the read request. For a RAID 1 or RAID 5 or RAID 6, on the other hand, the firmware recovers the data from the other arms to satisfy the host read request (step 436). Any type of known recovery process can be used without departing from the scope of the present disclosure. Embodiments of the present disclosure indicate a bad block to the hardware so that the hardware cannot process the read requests through accelerated method if such a bad block is present. The method then ends (step 440).

If there is no hash hit detected in step 412, there is no indication of a bad block in the flag(s) 312, or there is no bad block present in the bad block table 228, then the method proceeds with the hardware performing the read operation with or without diverting the read request to the firmware (step 444). If either of the following conditions are true, then the hardware performs the read request directly: (i) no hash hit is detected or (ii) no flag 312 indicated a presence of a bad block. Conversely, if the method resulted in the read request being diverted to firmware, then the read request will only be performed by the hardware if a false positive condition was detected at step 432. Said another way, if the method proceeds to step 432 and there is no matching address in the bad block table 228 that corresponds to an address associated with the read request, then the initial match made in steps 412 and 420 is treated as a false positive and the read command is re-issued through a hardware automated path. The method then proceeds with the hardware completing the command (step 448). Again, as with step 436, the manner in which the command is completed in step 448 may depend upon the nature of the RAID array. In a RAID 0 volume, the firmware will complete the read request with a status being reported back as a read success. In a RAID 1, RAID 5, or RAID 6 volume the firmware will recover the data from the other arms to satisfy the host read request. Thereafter, the method ends (step 440).

Figure 5:
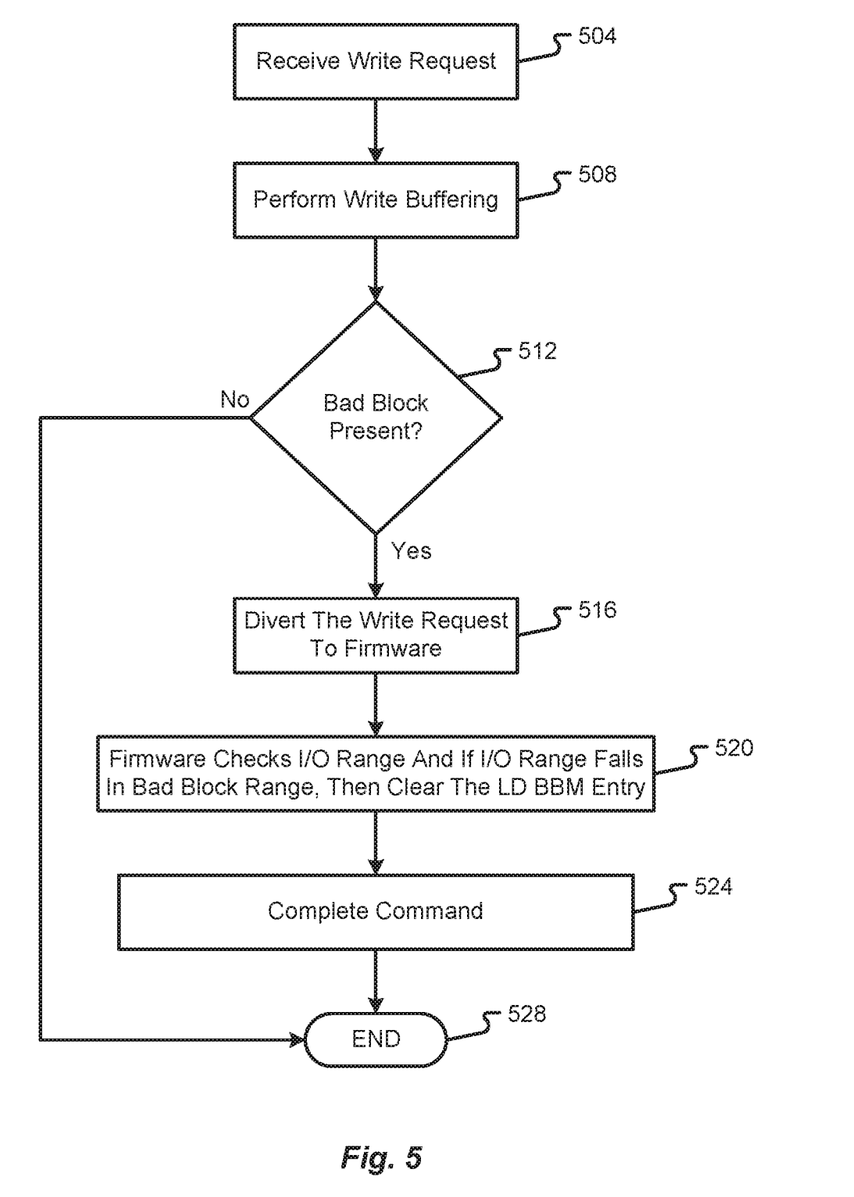
FIG. 5 is a flow diagram depicting a method of processing a write command in accordance with at least some embodiments of the present disclosure.

With reference now to FIG. 5, additional details of processing a write command will be described in accordance with at least some embodiments of the present disclosure. The method begins when a write request is received at the controller 108 from the host 104 (step 504). The controller hardware initially responds by initiating a buffering process (step 508). In this step, some or all data contained in the write request is temporarily stored in buffer memory 220 until the data can be committed to the storage device(s) 136. In general, write buffering may include allocating buffer memory 220, allocating cache segments/rows, and then stitching the buffers into cache and adding the cache segment/rows to a hash value.

The method continues with the hardware performing a hash search and/or analysis of flag(s) 312 in a hash slot element to determine if a bad block is present (step 512). If the hash slot element indicates the presence of a bad block, then the write command is diverted from hardware to firmware of the controller 108 (step 516). The firmware then checks the I/O range (e.g., the LBA spanned by the write request) against bad blocks identified in the bad block table 228 (step 520). If the range covered by the write request contains a bad block as determined with reference to the bad block table 228, then the entry in the bad block table 228 is cleared and the firmware is allowed to complete the write request (step 524).

If, however, the hash slot element 300 does not indicate the presence of a bad block as determined in step 512, then the write request is completed through the automated hardware path and the write request does not need to be processed by the firmware of the controller 108 (step 528).

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method for handling bad blocks in a hardware accelerated caching solution, the method comprising:
   maintaining a data structure in connection with a plurality of blocks used for data caching, the data structure including one or more hash values that (i) indicate a presence of a bad block and (ii) if a bad block is present, whether a corresponding Cache Segment Identifier (CSID) is valid or invalid;
   receiving an Input/Output (I/O) request;
   performing a hash search for the I/O request against the data structure;
   based on the results of the hash search, either performing the I/O request with a data block identified in the I/O request or diverting the I/O request to a new data block not identified in the I/O request;
   determining that the hash search resulted in a hash hit;
   in response to determining that the hash search resulted in the hash hit, checking the data structure to determine if a corresponding bad block is identified as valid or invalid; and
   in the event that the corresponding bad block is identified as invalid, diverting the I/O request to firmware such that the firmware is enabled to perform a table lookup and decide whether to identify the I/O request as failed with a medium error or to be treated as a false positive.

2. The method of claim 1, wherein the I/O request comprises a write request.

3. The method of claim 2, further comprising:
   checking an I/O range of the write request during the table lookup;

determining that the write request is covered by the I/O range; and in response to determining that the write request is covered by the I/O range, completing the write request and clearing an entry in the table.

4. The method of claim 3, wherein the write request is diverted from hardware to firmware such that the firmware is enabled to check the I/O range of the write request.

5. The method of claim 1, wherein the I/O request comprises a read request.

6. The method of claim 5, further comprising:
processing the read request through a hardware automated path.

7. The method of claim 1, wherein the data structure comprises a hash slot data structure that includes at least three bits that indicate: (i) whether a cache segment or cache row is valid in a CSID field; (ii) a presence of a bad block in a strip or row; and (iii) whether the CSID field is valid or invalid.

8. A memory control system, comprising:
a host interface that receives one or more host Input/Output (I/O) commands;
a storage interface that enables communication with a plurality of storage drives configured in a storage array;
a microprocessor; and
memory that includes computer-readable instructions that are executable by the microprocessor, the instructions including:
instructions that maintain a data structure in connection with a plurality of blocks used for data caching, the data structure including one or more hash values that (i) indicate a presence of a bad block and (ii) if a bad block is present, whether a corresponding Cache Segment Identifier (CSID) is valid or invalid;
instructions that perform a hash search for the I/O command against the data structure;
instructions that, based on the results of the hash search, either perform the I/O command with hardware or divert the I/O command to firmware for further analysis against a bad block table
instructions that determine that the hash search resulted in a hash hit
instructions that, in response to determining that the hash search resulted in the hash hit, check the data structure to determine if a corresponding bad block is identified as valid or invalid; and
instructions that, in the event that the corresponding bad block is identified as invalid, divert the I/O command to the firmware such that the firmware is enabled to perform a table lookup against the bad block table and decide whether to identify the I/O command as failed with a medium error or to be treated as a false positive.

9. The system of claim 8, wherein the I/O command comprises a write command.

10. The system of claim 9, wherein the instructions further include:
instructions that check an I/O range of the write command during the table lookup;
instructions that determine that the write command is covered by the I/O range; and instructions that, in response to determining that the write command is covered by the I/O range, complete the write command and clear an entry in the bad block table.

11. The system of claim 10, wherein the write command is diverted from the hardware to the firmware such that the firmware is enabled to check the I/O range of the write command.

12. The system of claim 8, wherein the I/O command comprises a read command.

13. The system of claim 12, wherein the instructions further comprise:
instructions that process the read request through a hardware automated path.

14. The system of claim 8, wherein the data structure comprises a hash slot data structure that includes at least three bits that indicate: (i) whether a cache segment or cache row is valid in a CSID field; (ii) a presence of a bad block in a strip or row; and (iii) whether the CSID field is valid or invalid.

15. A controller for managing memory that includes hardware accelerated caching, the controller comprising:
a microprocessor; and
memory that includes computer-readable instructions that are executable by the microprocessor, the instructions including:
instructions that maintain a data structure in connection with a plurality of blocks used for data caching, the data structure including one or more hash values that (i) indicate a presence of a bad block and (ii) if a bad block is present, whether a corresponding Cache Segment Identifier (CSID) is valid or invalid;
instructions that perform a hash search for an I/O command against the data structure;
instructions that, based on the results of the hash search, either perform the I/O command with hardware or divert the I/O command to firmware for further analysis against a bad block table;
instructions that determine that the hash search resulted in a hash hit;
instructions that, in response to determining that the hash search resulted in the hash hit, check the data structure to determine if a corresponding bad block is identified as valid or invalid; and
instructions that, in the event that the corresponding bad block is identified as invalid, divert the I/O command to the firmware such that the firmware is enabled to perform a table lookup against the bad block table and decide whether to identify the I/O command as failed with a medium error or to be treated as a false positive.

16. The controller of claim 15, wherein the data structure comprises a hash slot data structure that includes at least three bits that indicate: (i) whether a cache segment or cache row is valid in a CSID field; (ii) a presence of a bad block in a strip or row; and (iii) whether the CSID field is valid or invalid.

17. The controller of claim 15, wherein the I/O command comprises either a read command or a write command and wherein the read or write command is diverted to the firmware for further analysis if the hash search results in a hash hit.

* * * * *